US011237257B2

(12) United States Patent
Ito et al.

(10) Patent No.: US 11,237,257 B2
(45) Date of Patent: Feb. 1, 2022

(54) ARITHMETIC PROCESSOR, ARITHMETIC PROCESSING METHOD, AND COMPUTER READABLE MEDIUM STORING COMPUTER PROGRAM

(71) Applicant: DENSO WAVE INCORPORATED, Aichi-pref. (JP)

(72) Inventors: Kunihiko Ito, Chita-gun (JP); Gaku Takano, Tokyo (JP); Wataru Kobori, Tokyo (JP); Tetsuya Iwasaki, Kariya (JP); Keiji Matsumoto, Kariya (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 696 days.

(21) Appl. No.: 15/597,447

(22) Filed: May 17, 2017

(65) Prior Publication Data
US 2017/0336498 A1 Nov. 23, 2017

(30) Foreign Application Priority Data

May 18, 2016 (JP) .............................. JP2016-099764

(51) Int. Cl.
| G01S 7/493 | (2006.01) |
| G01S 7/487 | (2006.01) |
| G01S 17/42 | (2006.01) |
| G01S 17/50 | (2006.01) |
| G01S 7/481 | (2006.01) |
| G01S 17/08 | (2006.01) |

(52) U.S. Cl.
CPC .............. *G01S 7/493* (2013.01); *G01S 7/487* (2013.01); *G01S 7/4817* (2013.01); *G01S 17/08* (2013.01); *G01S 17/42* (2013.01); *G01S 17/50* (2013.01)

(58) Field of Classification Search
CPC ....................................................... G01S 7/493
See application file for complete search history.

(56) References Cited

FOREIGN PATENT DOCUMENTS

| JP | 2003-123074 A | | 4/2003 |
| JP | 2003227873 | * | 8/2003 |

* cited by examiner

*Primary Examiner* — John E Breene
*Assistant Examiner* — Jeffrey C Morgan
(74) *Attorney, Agent, or Firm* — Oliff PLC

(57) ABSTRACT

An arithmetic processor is provided to detect a background even when observed data values vary. The processor includes a background candidate data memory 20 storing data as a background candidate. In the data, an observation count, as the number of times of obtaining the same observation data, is correlated with distance data representing the observed data. The processor also includes a ranking section 11 ranking background candidates using the observation count as a basis; an observation count update section 12 comparing observed data with a background candidate stored in the memory 20 to find a match, counting observations of the background candidate if there is a match, and replacing distance data of a lowest-ranked background candidate with the observed data if there is no match; and a background determination section 13 determining there are two backgrounds if the top two background candidates remain unchanged for a predetermined period.

26 Claims, 13 Drawing Sheets

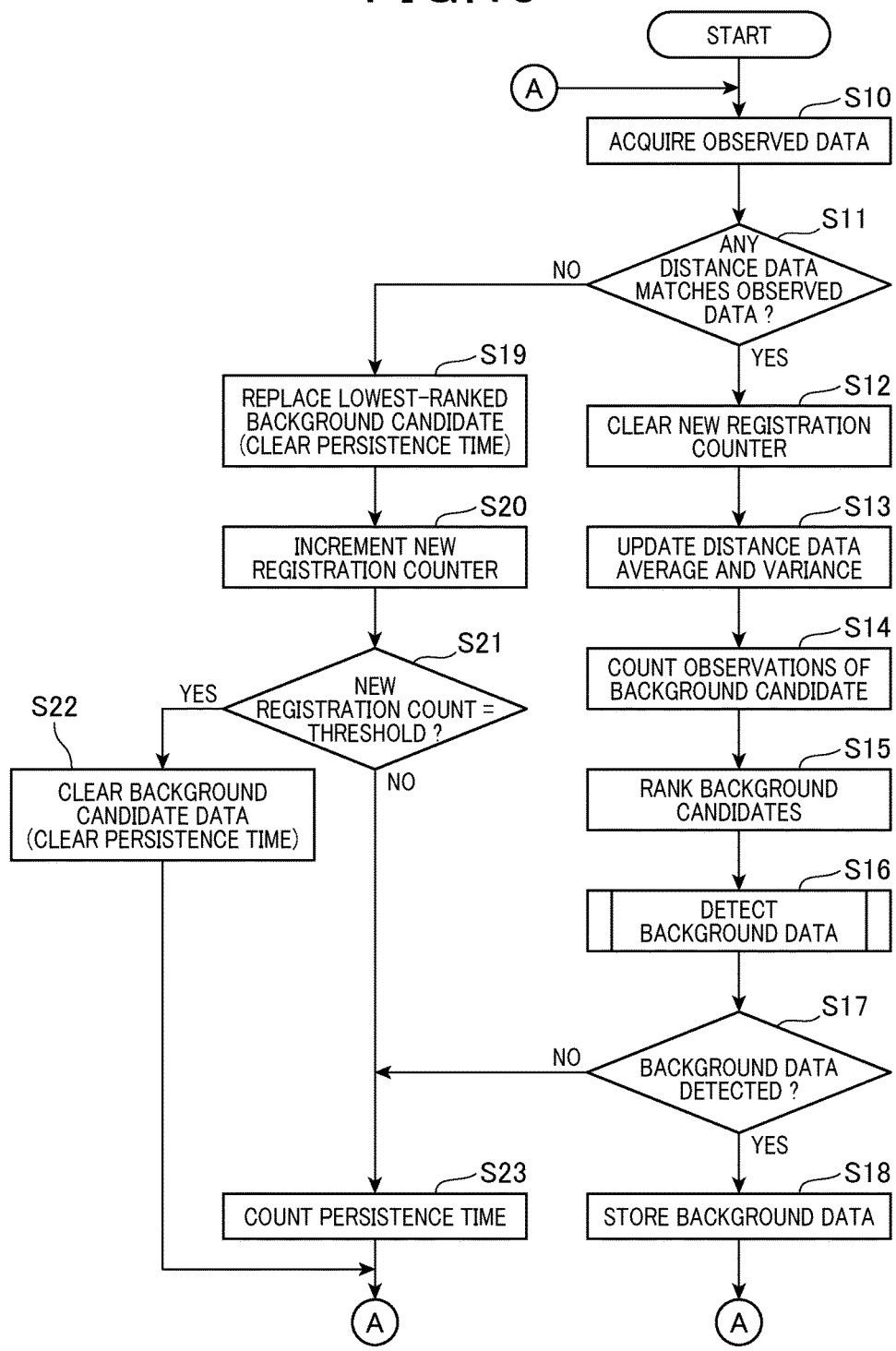

ARITHMETIC PROCESSOR, ARITHMETIC PROCESSING METHOD, AND COMPUTER READABLE MEDIUM STORING COMPUTER PROGRAM

CROSS-REFERENCE TO RELATED APPLICATION

This application is based on and claims the benefit of priority from earlier Japanese Patent Application No. 2016-099764 filed May 18, 2016, the description of which is incorporated herein by reference.

BACKGROUND OF THE INVENTION

Technical Field of the Invention

The present invention relates to a method of processing data obtained by a ranging device.

Related Art

Sensors referred to as LIDAR (light detection and ranging) sensors are receiving attention. LIDAR sensors enable real-time detection of surrounding objects with high accuracy. LIDAR is a remote sensing technology using light. With the LIDAR technology, a distance to an object is calculated based on the time from when light is emitted from a device until when the light is received by the device after being reflected by the object. The direction into which the light is emitted is scanned to detect an object in the surrounding region.

As disclosed in a patent document JP2003-123074A, a background subtraction technique is well known as a method of detecting a moving object in performing image processing. In the background subtraction technique, a background image is subtracted from an input image containing an object to be extracted and containing the background image to thereby detect an object which is not part of the background. The patent document JP2003-123074A discloses a method in which the background image used with the background subtraction technique is sequentially updated. In the invention disclosed in the patent document JP2003-123074A, pixels other than those which have been detected as moving object areas are each subjected to counting, and the pixels that have reached a predetermined count, that is, the pixels that have been stationary for a predetermined time or more, are stored as background.

Unlike the cases of using an image processor, in the case of using a ranging device, the ranging device may cause variation in measured distance data. Specifically, if an angle of radiation of light is shifted only slightly, the objects to which the light is applied may differ, resulting in randomly measuring the distance to a faraway object or the distance to a nearby object. For example, in a situation where there is a wire mesh in front of a building, use of such a ranging device may result in randomly measuring the distance to the wire mesh or the distance to the building behind the wire mesh. When the background subtraction technique used for image processing is applied to such cases, it is difficult to stably specify the background. In the situation mentioned above, the wire mesh and the building that are stationary should be specified as background, but may be specified, instead, as moving objects forever. This is because observation of the wire mesh and observation of the building behind the wire mesh successively occur, and stability of the observed data does not continue for a predetermined period.

SUMMARY OF THE INVENTION

In light of the circumstances set forth above, the present invention has an object to provide an arithmetic processor capable of properly detecting background even when observed data values vary.

An arithmetic processor of the present invention processes observed data obtained by a ranging device and includes a background candidate data memory, a ranking section, an observation count update section, a background determination section, and a background data memory. The background candidate data memory stores data as a background candidate, the data being data in which an observation count that is the number of times of obtaining the same observation data is correlated with distance data representing the observed data. The ranking section uses the observation count as a basis for ranking a plurality of background candidates stored in the background candidate data memory. The observation count update section compares observed data obtained by the ranging device with distance data of a background candidate stored in the background candidate data memory to find a match between the observed data and the background candidate of the distance data, counts observations of the background candidate if there is a match, and replaces distance data of a lowest-ranked background candidate with the observed data in the absence of a background candidate matching the observed data. The background determination section determines there are M backgrounds if M background candidates continue to be ranked in the top N (M≤N) for a predetermined period, and selects the M background candidates as backgrounds. The background data memory stores background data obtained by the background determination section.

Thus, if there is variation in the observed data obtained from the ranging device according to the conditions of an object, a proper number of backgrounds can be obtained based on the observed data by ranking background candidates, based on the observation count, and finding a plurality of background candidates ranked in top places for a predetermined period with possible transposition therebetween. In the present specification, observed data refers to data that is obtained from a ranging device in individual observations, and distance data refers to data on a distance to a background candidate obtained by processing a plurality of observed data that are determined to be of the same background candidate. The distance data that can be used includes an average, a median, or a maximally frequent occurrence, which represents a plurality of observed data.

In the arithmetic processor of the present invention, the background candidate data memory may store persistence time from when each background candidate has been initially observed; and if the observation count is the same between background candidates, the ranking section may rank the background candidate having shorter persistence time at a higher rank.

If the observation count is the same, it means that the background candidate whose observations have been counted in a short time has been more frequently observed. Accordingly, by ranking the background candidate having shorter persistence time in a top place, the background can be properly obtained.

In the arithmetic processor of the present invention, the background candidate data memory may further store data related to variance of observed data that has been determined to match each background candidate; and the observation count update section may determine a range of the distance data on the basis of the data related to variance, and may determine the observed data to match the distance data if the observed data falls in the range of the distance data.

Variation in acquired observed data depends such as on the materials or subtle movement of an object. In this regard, the arithmetic processor of the present invention is configured to have data related to variance of observed data for each background candidate, and to use this data as a basis to determine if there is a match between the observed data and the distance data of the already obtained background candidate. Accordingly, a proper determination can be made as to whether the observed data matches the distance data of the background candidate.

In the arithmetic processor of the present invention, the data related to variance of the observed data may be updated when observations of the background candidate are counted, based on a value of the observed data newly obtained, and data related to variance before counting observations, and the observation count.

Thus, use of the data related to variance before counting observations enables recalculation of the data related to variance through updating processing.

In the arithmetic processor of the present invention, the background determination section may exclude a background candidate of which the observation count does not reach a predetermined threshold, from among the M background candidates that have continued to be ranked in the top N, to obtain the number of backgrounds and the backgrounds.

Background candidates of which the observation count does not reach a predetermined threshold are highly likely to be noise. Accordingly, by excluding these background candidates from the backgrounds, backgrounds with high accuracy alone can be obtained.

In the arithmetic processor of the present invention, in the absence of M background candidates that have continued to be ranked in the top N (M≤N) for a predetermined period, if there is a background candidate that is present for a second predetermined period shorter than the predetermined period, the background determination section may select the background candidate as a background.

Thus, the arithmetic processor is configured to determine the background candidate that has been ranked first for the second predetermined period to be a background, in the absence of M background candidates that have continued to be ranked in the top N. With this configuration, a background can be properly obtained if the observed data does not vary.

In the arithmetic processor of the present invention, the observation count update section may reset background candidate data if observed data matching none of background candidates is consecutively obtained for a predetermined number of times.

If observed data that matches none of the background candidates stored in the background candidate data memory is consecutively obtained, it is considered that the ranging device has captured data on a non-background object. With the configuration of the present invention, background candidate data is reset if the situation of not finding any matched background candidates continues, so that a background can be properly detected when stable observed data comes to be obtained.

In the arithmetic processor of the present invention, the ranging device may two-dimensionally scan a three-dimensional space to acquire observed data for each observation direction; and the background determination section may obtain the number of backgrounds and the backgrounds for each observation direction.

In this way, by performing processing for each observation direction as a result of two-dimensional scanning, a background object can be obtained in a three-dimensional space.

In the arithmetic processor of the present invention, newly obtained background data may be added to the background data memory, and old background data having a position in front of the newly obtained background data may be deleted from the background data memory.

In this way, addition of newly obtained background data in the background data memory enables management of both of old background data and new background data. Thus, for example, when an automobile is stopped in front of a building and the automobile is determined to be part of background, and when the automobile starts moving again, the building behind the automobile, which has originally been background, is prevented from being erroneously determined to be non-background. By deleting old background data having a position in front of the newly obtained background data, a contradictory situation where old background data has a position in front of newly obtained background data is prevented from occurring.

The arithmetic processor of the present invention may further include a determination section that compares observed data acquired by the ranging device with background data stored in the background data memory, and determines that the observed data relates to a non-background, in the absence of background data matching the observed data.

With this configuration, whether observed data is a non-background can be properly determined using background data.

An arithmetic processing method, in which observed data obtained by a ranging device is processed by an arithmetic processor to detect a background, includes: a step of preparing a background candidate data memory that stores data as a background candidate, the data being data in which an observation count that is the number of times of obtaining the same observation data is correlated with distance data representing the observed data, the step being performed by the arithmetic processor; a step of comparing observed data obtained by the ranging device with distance data on a background candidate stored in the background candidate data memory to find a match between the observed data and the background candidate of the distance data, counting observations of the background candidate if there is a match, and replacing distance data on a lowest-ranked background candidate with the observed data in the absence of a background candidate matching the observed data, the step being performed by the arithmetic processor; a step of using the observation count as a basis to rank a plurality of background candidates stored in the background candidate data memory, the step being performed by the arithmetic processor; a step of determining there are M backgrounds if M background candidates continue to be ranked in the top N (M≤N) for a predetermined period, and selecting the M background candidates as backgrounds, the step being performed by the arithmetic processor; and a step of storing background data obtained by the background determination section in the background data memory, the step being performed by the arithmetic processor.

To detect a background by processing observed data obtained by a ranging device, a program is used to cause a computer to execute: a step of preparing a background candidate data memory that stores data as a background candidate, the data being data in which an observation count that is the number of times of obtaining the same observation data is correlated with distance data representing the observed data; a step of comparing observed data obtained by the ranging device with distance data on a background candidate stored in the background candidate data memory to find a match between the observed data and the background candidate of the distance data, counting observations of the background candidate if there is a match, and replacing distance data of a lowest-ranked background candidate with the observed data in the absence of a background candidate matching the observed data, the step being performed by the arithmetic processor; a step of determining there are M backgrounds if M background candidates continue to be ranked in the top N (M≤N) for a predetermined period, and selecting the M background candidates as backgrounds; and a step of storing background data obtained by the background determination section in the background data memory.

According to the present invention, a proper number of backgrounds can be obtained based on observed data even when the observed data from a ranging device vary.

BRIEF DESCRIPTION OF THE DRAWINGS

In the accompanying drawings:

FIG. 13 illustrates a flow diagram of an operation for detecting background performed by the arithmetic processor according to the second embodiment.

DETAILED DESCRIPTION OF THE PREFERRED EMBODIMENTS

Referring to the accompanying drawings, an arithmetic processor according to an embodiment of the present embodiment will be described below.

First Embodiment

Figure 1:
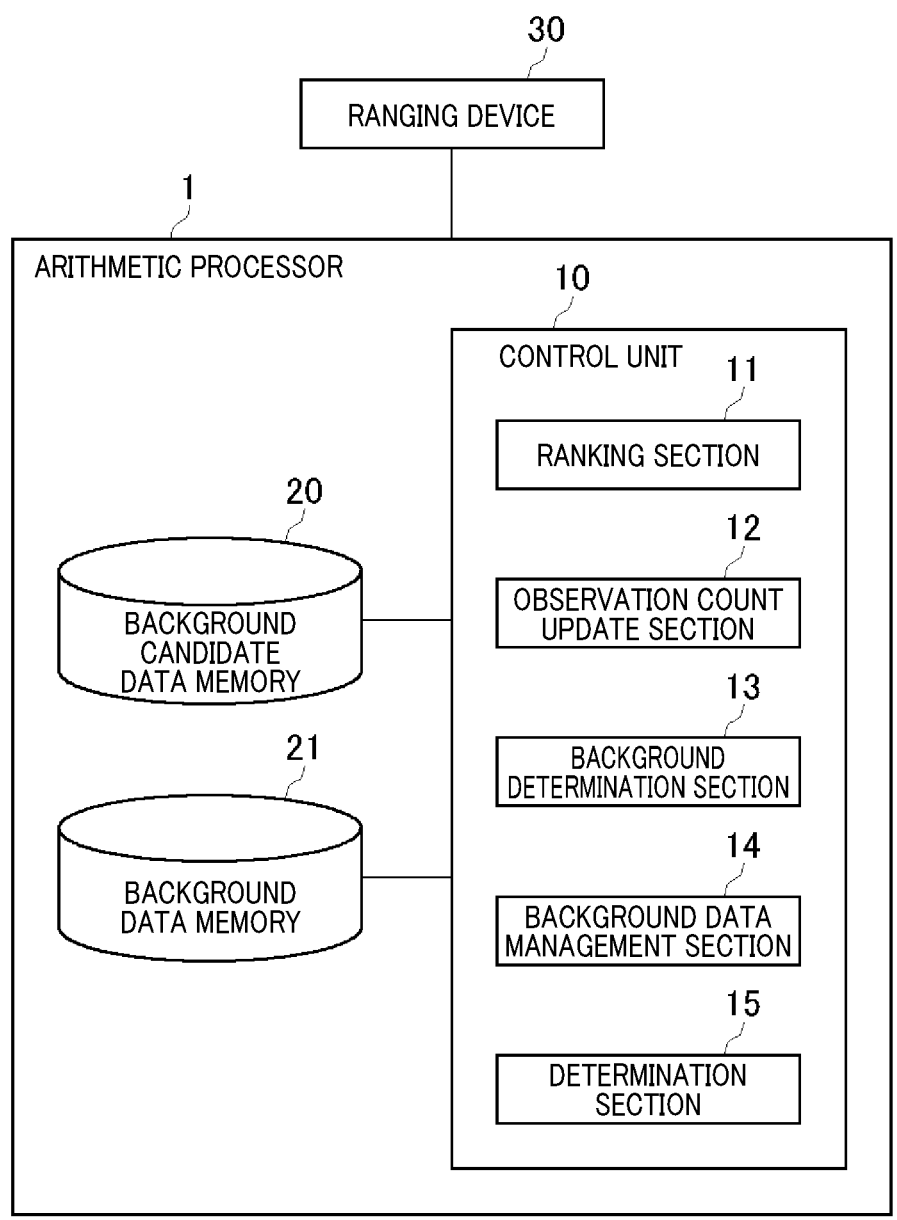
FIG. 1 illustrates a configuration of an arithmetic processor according to a first embodiment of the present invention.

FIG. 1 illustrates a configuration of an arithmetic processor 1 according to a first embodiment of the present invention. The arithmetic processor 1 is connected to a ranging device 30.

The ranging device 30 is mounted to an outer wall, for example, of a building to measure a distance to an object present in a detection area. As an example, the ranging device 30 is configured by a laser light radiation section that radiates laser light, a mirror that reflects the laser light radiated from the laser light radiation section towards the detection area, a motor that rotates the mirror, and a laser light reception section that receives light reflected off an object in the detection area. The ranging device 30 radiates laser light into a detection area to receive the reflected light, and uses the data of the reflected light as a basis to calculate the distance to an object point. The ranging device 30 rotates the mirror to two-dimensionally scan over an area into which the laser light is radiated, and measures a distance for each of a plurality of radiation angles, thereby detecting an object in a three-dimensional space. Thus, the ranging device 30 produces a distance image of an object, based on the distance data acquired for the plurality of radiation angles. The observed data in the various directions in the distance image correspond to respective pixels.

In the present embodiment, the ranging device 30 performs two-dimensional scanning at regular intervals to acquire observed data. It is desirable that the interval for acquiring observed data is determined from the viewpoint of the processing loads and of noise suppression and thus may be one second, for example.

The arithmetic processor 1 acquires observed data measured by the ranging device 30 and performs processing for detecting a non-background object, based on the observed data. To detect a non-background object, the arithmetic processor 1 stores stationary background data in a background data memory 21. The background data memory 21 stores a plurality of background data acquired at different times. For example, when a moving object, such as a vehicle, is stopped and blocks the background such as a building behind the object, the stopped moving object turns to background. When the stopped moving object starts to move again and the building behind the object appears, the background data stored in the memory 21 is used so that the building is not treated as a non-background object.

In the present embodiment, the arithmetic processor automatically produces background data, based on the observed data acquired from the ranging device 30. Basically, the observed data, if the value thereof remains unchanged for a predetermined period, is determined to be a background.

The arithmetic processor 1 is provided with a control unit 10 which includes a ranking section 11, an observation count update section 12, a background determination section 13, and a background data management section 14, as a configuration for producing background data from observed data. The control unit 10 also includes a determination section 15 that determines whether an object associated with observed data is a non-background object. The arithmetic processor 1 includes a hardware component configured by a computer that includes CPU, RAM, ROM, hard disc, monitor, keyboard, and the like. The components described above are realized when a program stored in the ROM is read and executed.

[Background Data Production]

The following description addresses a configuration in which the arithmetic processor 1 of the present embodiment detects a background to produce background data. The arithmetic processor 1 of the present embodiment performs processing for each pixel to determine whether the pixel is a background pixel or a non-background pixel and, if the pixel is a background pixel, store it as background data. The following description may be provided focusing on one pixel; however, the same processing applies to each of other pixels, that is, observed data obtained from other directions.

Figure 2:
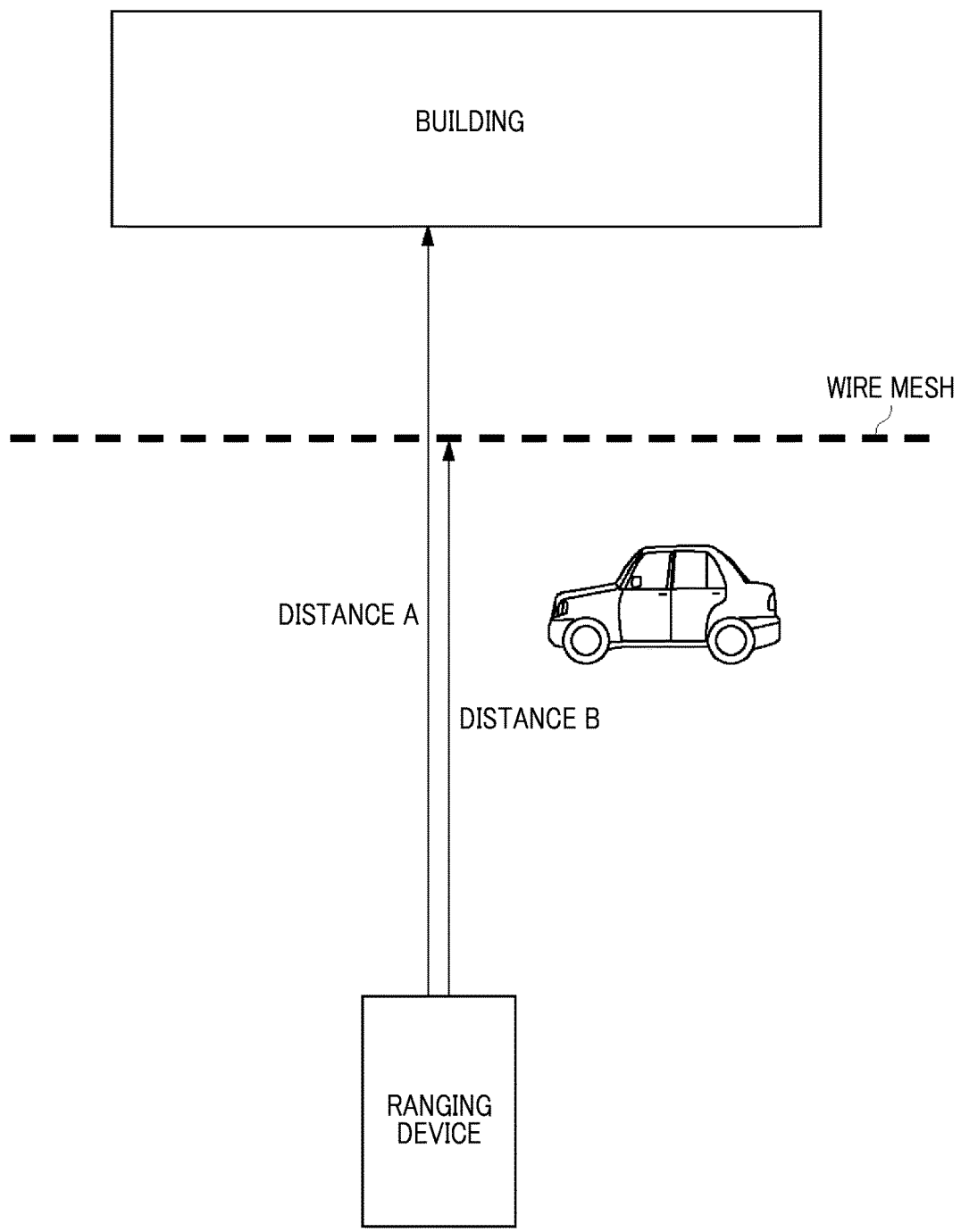
FIG. 2 illustrates a disadvantage caused in producing background data, based on observed data.

First, the problem to be solved by background-production processing performed by the arithmetic processor 1 of the present embodiment will be described. FIG. 2 illustrates a disadvantage caused in producing background data of the basis of observed data. FIG. 2 shows a situation in which there is a building in an observation direction of the ranging device 30, and that there is a wire mesh in front of the building. The ranging device 30 measures a distance to a point in an object in a predetermined observation direction. If light is reflected off the wire mesh, a distance B to a point in the wire mesh is obtained, but if light passes through the wire mesh and is reflected off the building, a distance A to a point in the building is obtained.

Only a slight displacement of the ranging device 30 may or may not cause the light emitted from the ranging device 30 to pass through the wire mesh, resulting in variation in observed data. Therefore, in the situation as shown in FIG. 2, the observed data is unstable and the distance to the background cannot be determined. The arithmetic processor 1 of the present embodiment is a device coping with this disadvantage. The basic idea is that several observed data obtained from the same observation direction are used as a basis to determine there is a background at a distance measured several times. For example, when an observation frequency is high for a plurality of distances, such as the distances A and B of FIG. 2, it is determined that a plurality of backgrounds are concurrently present, and accordingly the number of backgrounds are calculated, while the distances to the respective backgrounds are specified. In the following, a specific configuration of the arithmetic processor 1 will be described.

The arithmetic processor 1 includes a background candidate data memory 20 in which data of a plurality of candidates for a background are stored. The number of background candidates to be stored in the background candidate data memory 20 may be determined in advance. In the present embodiment, the number of background candidates is three.

Figure 3:
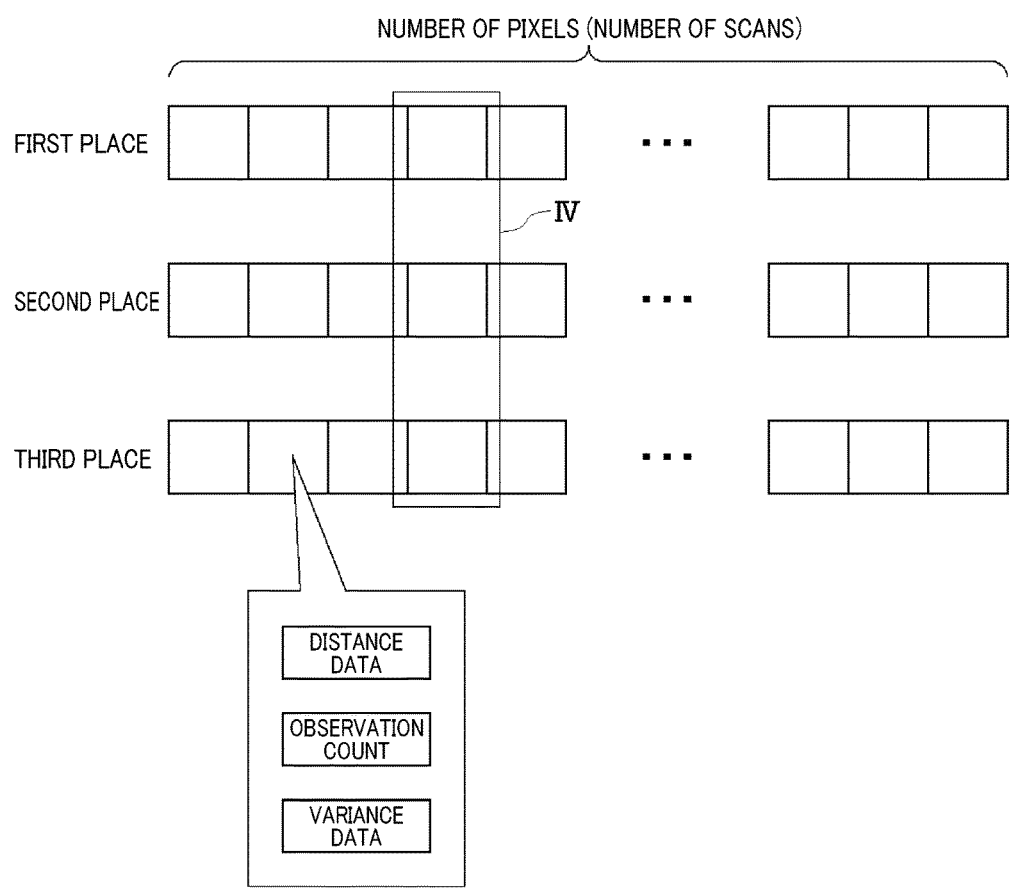
FIG. 3 illustrates an example of data stored in a background candidate data memory, according to the first embodiment.

FIG. 3 illustrates a storage area prepared for the background candidate data memory 20. In the present embodiment, since the number of background candidates is three, the background candidate data memory 20 is ensured to have a storage area for three data arrays for storing these background candidates. Each data array has elements whose number conforms to the number of pixels obtained by the ranging device 30.

The elements of the individual data arrays correspond to distance data, observation count, and variance data. The distance data relates to the distance to a background candidate. The distance data is not the observed data obtained by the ranging device 30, but is a representation of the distances of several observed data. In the present embodiment, an average of several observed data is used. The observation count corresponds to the number of times the background candidate, represented by the distance data, was observed. The observation count update section 12 of the control unit 10 counts observations if the observed data is determined to match the distance data, taking the match as implying that the background candidate associated with the distance data has been observed.

Let us discuss herein matching between observed data and distance data. If the observed data is within a predetermined range in which the distance data falls, the arithmetic processor 1 then determines the observed data matches the distance data. In the present embodiment, the predetermined range is determined using variance of observed data. The variance data is also included as an element in the arrays. Variation of observed data depends on objects, but use of variance of observed data allows matching to be properly done, based on a criterion suitable for the object. Specifically, when the difference between the observed data and the distance data is not more than the following criterion that uses a variance $\sigma^2$ and a coefficient k, the observed data is determined to match the distance data.

$$k\sqrt{\sigma^2}$$

Figure 4A:
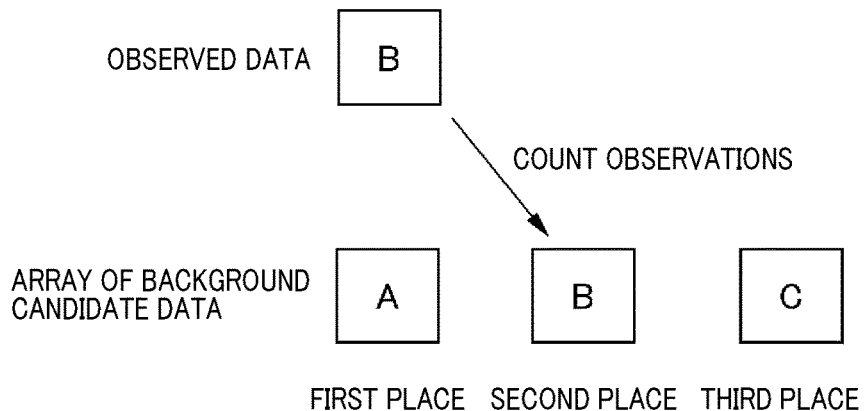
FIGS. 4A and 4B each illustrate processing of counting observations, according to the first embodiment.
Figure 4B:
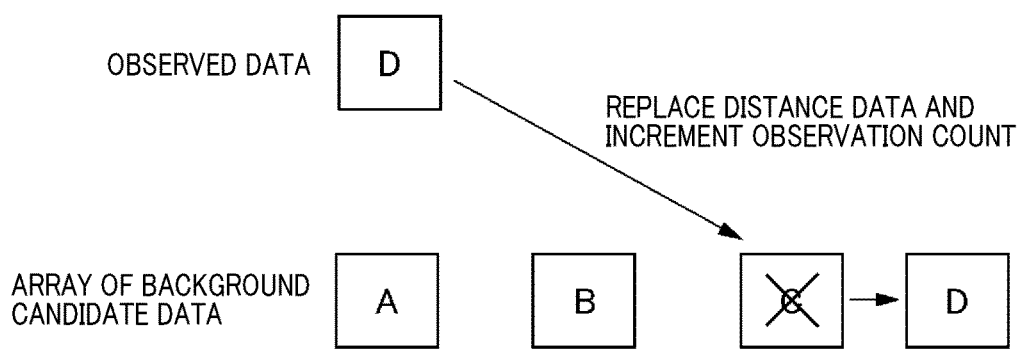

FIGS. 4A and 4B illustrate update of background candidate data stored in the background candidate data memory 20. FIGS. 4A and 4B illustrate one pixel indicated in the frame IV of FIG. 3. Distance data A, B and C are stored in the elements of first- to third-place background candidate data arrays, respectively. In the example shown in FIG. 4A, observed data B has been obtained, and observations are counted for the second-place data array in which the distance data B is stored. In the example shown in FIG. 4B, observed data D has been obtained. In this case, since no distance data corresponding to the observed data D is stored, the third-place (the lowest rank) distance data is replaced by the distance data D. The above processing is iterated to count observations of the background candidate which is frequently observed.

Every time the observation count is updated, the ranking section 11 of the control unit 10 ranks the background candidates for each of the pixels, based on the observation count. Then, the ranking section 11 memorizes the duration of time in which the ranking remains unchanged, and the duration of time in which the top two background candidates remain unchanged. The expression "the top two background candidates remain unchanged" refers to that the same two background candidates keep occupying the first and second places, with possible transposition therebetween.

For example, as shown in FIG. 2, if the observation data varies between the building having the distance A and the wire mesh having the distance B, observations of the background candidates of the distance data A and the distance data B are counted, so that the distance data A and B come to occupy the first or second place. If the distance data A and B occupy either first or second place, the duration of time of the top two background candidates becomes long.

The background determination section 13 of the control unit 10 determines that there are two concurrently observed backgrounds if two top background candidates remain unchanged for a predetermined period (hereinafter referred to as first predetermined period), and detects both as backgrounds. However, if the observation count of the second-place background candidate does not reach a predetermined threshold, the second-place background candidate is not determined to be a background even if the top two have remained unchanged for the predetermined period.

Figure 5A:
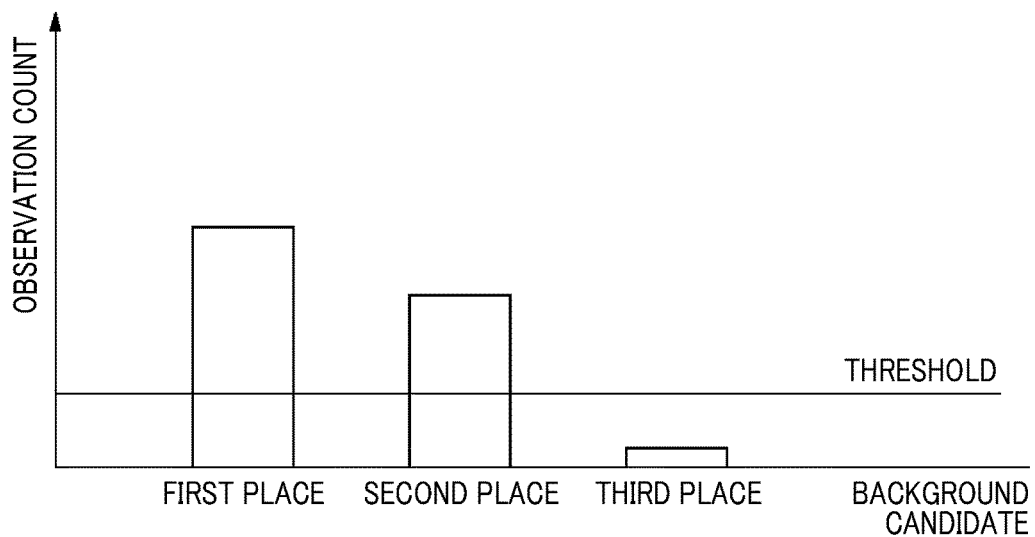
FIGS. 5A and 5B each illustrate a relationship between a threshold and the observation count of a second-place background candidate, according to the first embodiment.
Figure 5B:
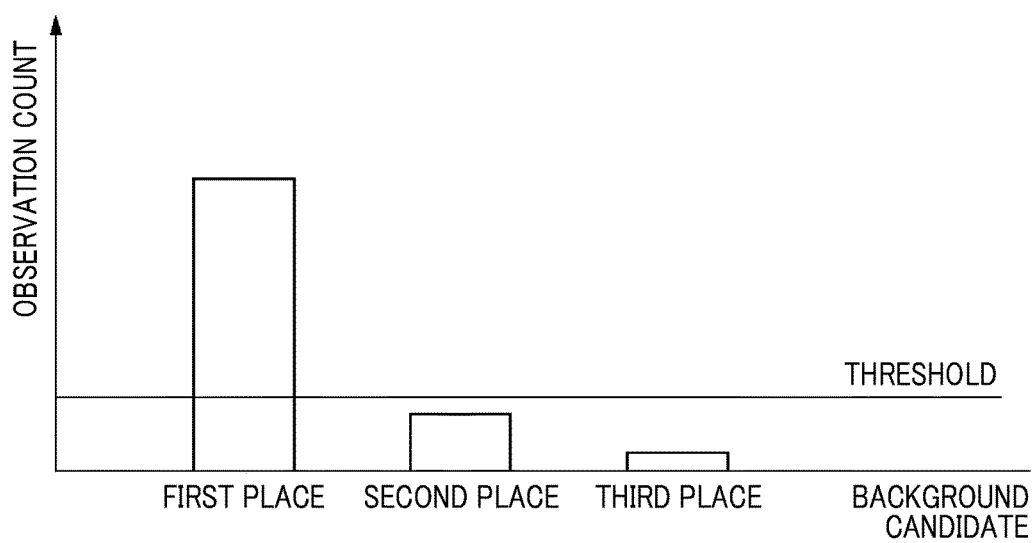

FIGS. 5A and 5B illustrate the observation counts of the background candidates when the top two background candidates remain unchanged for the predetermined period. As shown in FIG. 5A, if the observation count of a second-place background candidate is not less than the threshold, it is determined that the first- and second-place background candidates are backgrounds. As shown in FIG. 5B, if the observation count of the second-place background candidate does not reach the threshold, the first-place background candidate is determined to be a background, while the second-place background candidate is not determined to be a background.

The present embodiment is being described by way of an example in which, if two background candidates continue to be ranked first or second for the predetermined period, it is determined that there are two backgrounds. This corresponds to the case in which M and N are both 2. Not being limited to this case, the arithmetic processor of the present invention may determine that there are M backgrounds if M background candidates continue to be ranked in the top N (M≤N) for the predetermined period.

The arithmetic processor 1 of the present embodiment determines the first-place background candidate to be a background if the duration of time of the top two background candidates keeping their ranks is shorter than the predetermined period, based on whether the period for the first-place background candidate to keep the first place has become equal to the predetermined period. The predetermined period referred to herein (hereinafter referred to as second predetermined period) is shorter than the predetermined period used for determining the top two background candidates.

[Management of Background Data]

The background data management section 14 of the control unit 10 uses as a basis the background data obtained through the method described above to update the data stored in the background data memory 21 to thereby manage background data. The arithmetic processor 1 of the present embodiment stores data of three backgrounds in the background data memory 21. Description herein is being provided by way of an example of using data of three backgrounds. As an alternative to this, however, data of four or more backgrounds may be stored in the background data memory 21. If there is new background data, the background data management section 14 adds thereto new background candidate data, while deleting old background data.

Figure 6A:
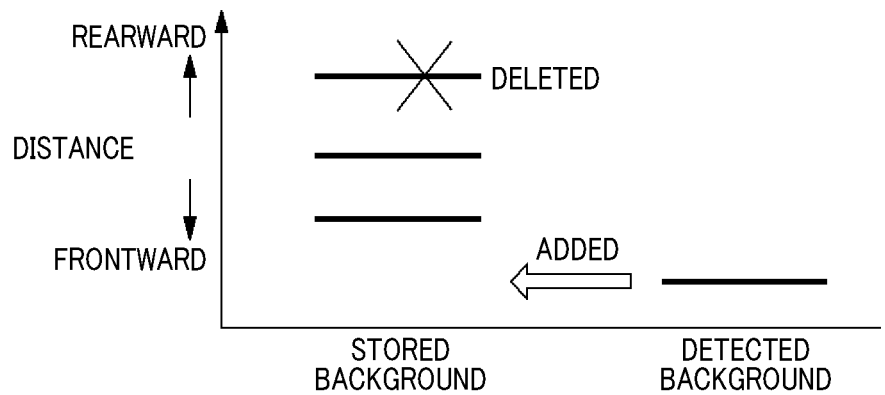
FIGS. 6A, 6B and 6C each illustrate processing of storing background data in the background data memory, according to the first embodiment.
Figure 6B:
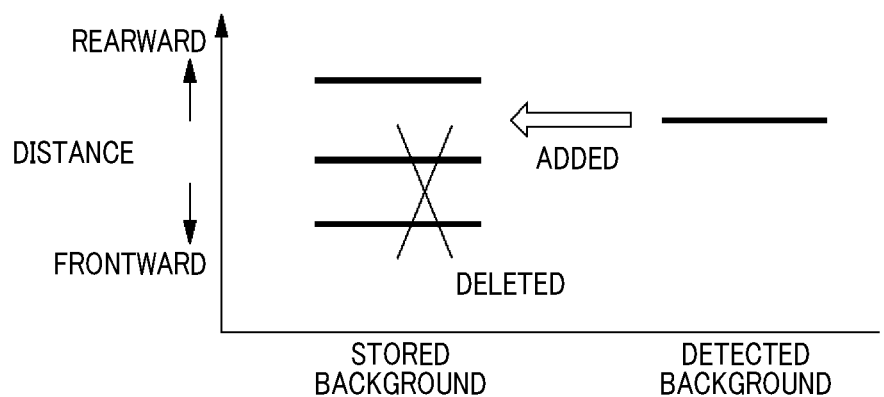
Figure 6C:
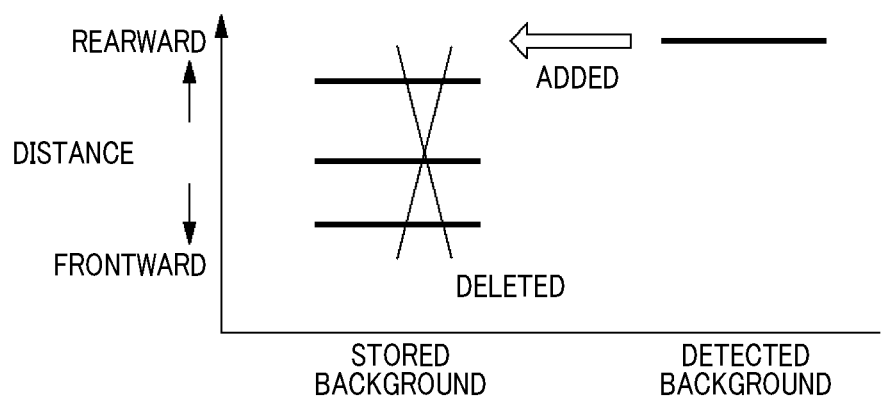

FIGS. 6A to 6C and FIGS. 7A to 7D illustrate examples showing which of the old background data should be deleted when there is newly detected background data, for addition of the new background data. FIGS. 6A to 6C illustrate an example in which one background data is newly detected. FIGS. 7A to 7D illustrate an example in which two background data are newly detected. It should be noted that FIGS. 6A to 6C and FIGS. 7A to 7D illustrate processing in a memory space, but the positions of the data in the memory space are expressed in these figures in terms of real space. As shown in these figures: (1) Old background data that are positioned further towards the front than the new background data in the memory space are deleted; and (2) Old background data are sequentially deleted from the ones positioned most rearward in the memory space, such that the number of deleted data will be equivalent to the number of added background data.

As shown in FIG. 6A, if the new background data corresponds to a position further towards the front than any of the old background data, the background data having the most rearward position is deleted, for addition of the new background data. As shown in FIG. 6B, if the new background data corresponds to a next-to-most-rearward position, then the old background data having positions in front of the new background data are deleted, for storage of the new background data. In this case, there are two background data resultantly. As shown in FIG. 6C, if the new background data corresponds to a most rearward position, all the old background data are deleted, for storage of the new background data. In this case, there is only one background data resultantly.

Figure 7A:
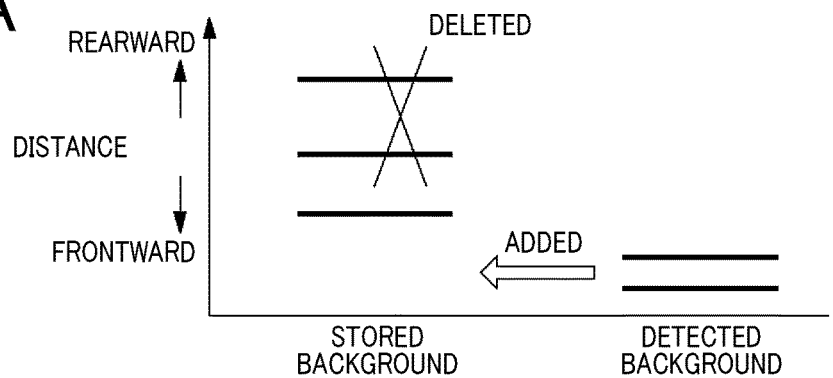
FIGS. 7A, 7B, 7C and 7D each illustrate processing of storing background data in the background data memory, according to the first embodiment.
Figure 7B:
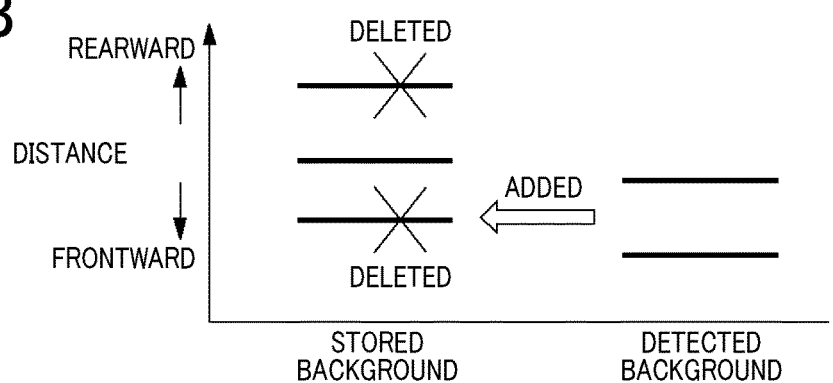
Figure 7C:
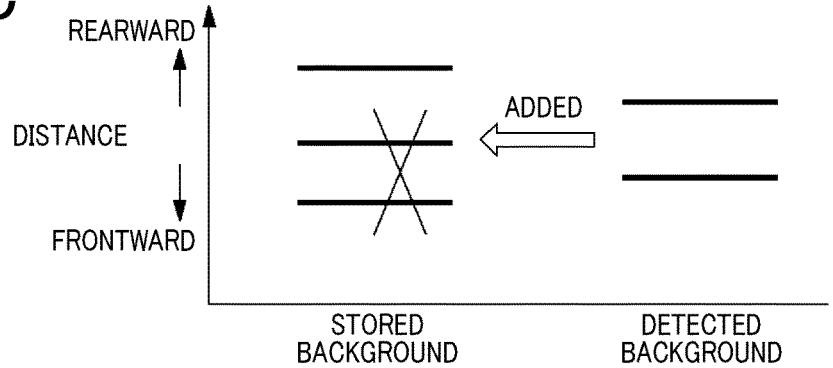
Figure 7D:
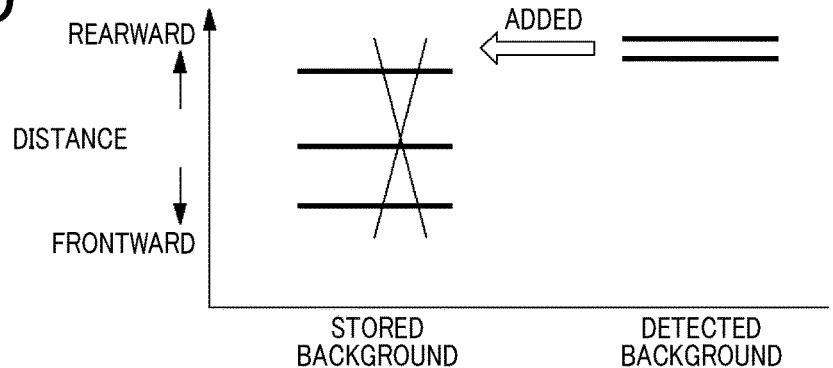

As shown in FIG. 7A, if the two new background data correspond to positions further towards the front than any of the old background data, the two old background data having the most rearward and next-to-most-rearward positions are deleted, for addition of the two new background data. As shown in FIG. 7B, if one of the two new background data corresponds to the most frontward position and the other corresponds to a position further towards the rear than the old background data having the most frontward position, the old background data having the most frontward position and the most rearward position are deleted, for the addition of the two new background data. As shown in FIG. 7C, of the two new background data, if the rear one corresponds to a position further towards the rear than the old background data having the next-to-most-frontward position, the two old background data having the most frontward and next-to-most-frontward positions are deleted, for the addition of the two new background data. As shown in FIG. 7D, of the two new background data, if the front one corresponds to a position further towards the rear than the old background data having the most rearward position, all the old background data are deleted, for storage of the two new background data. In this case, there are two background data resultantly.

[Operation of Arithmetic Processor]

The following description addresses the operation of the arithmetic processor 1. The arithmetic processor 1 produces background data from observed data that has been acquired by the ranging device 30, and detects an object point in non-background using the observed data and the background data.

Figure 8:
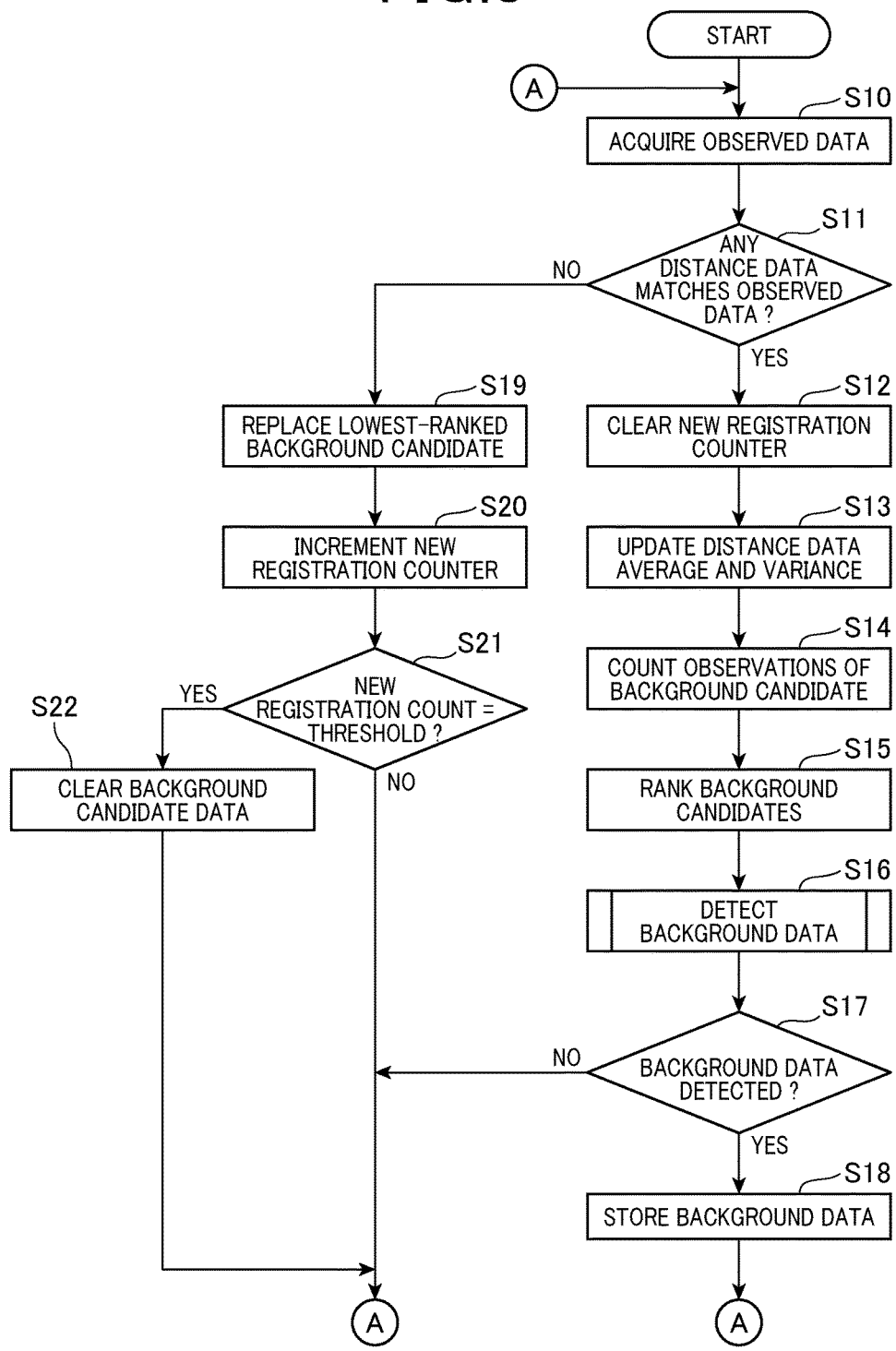
FIG. 8 illustrates a flow diagram of an operation for detecting background performed by the arithmetic processor according to the first embodiment.

FIG. 8 is a flow diagram illustrating an operation in which the arithmetic processor 1 produces background data on the basis of observed data. Firstly, the arithmetic processor 1 acquires observed data from the ranging device 30 (step S10). As a result of two-dimensionally scanning a three-dimensional space, the ranging device 30 acquires observed data for the observation directions. Although FIG. 8 shows processing for one direction (i.e., for one pixel), the flow shown in FIG. 8 is performed for all the pixels. The acquisition of observed data (step S10) is cyclically performed (e.g., every 1 second). The flow shown in FIG. 8 is executed every time observed data is acquired.

After acquiring observed data, the arithmetic processor 1 reads background candidate data of the corresponding pixel from the background data memory 20 to determine whether there is a background candidate having the same distance data as the observed data (step S11). At step S11, the arithmetic processor 1 does not determine whether the observed data completely matches the distance data, but determines whether the observed data is within a predetermined range in which the distance data falls. Specifically, as described above, the arithmetic processor 1 determines whether the difference between the observed data and the distance data is not more than the criterion that has been determined based on variance.

If the observed data is determined to be equal to the distance data (YES at step S11), the arithmetic processor 1 clears a new registration counter (step S12). The new registration counter serves as a counter for recording the number of consecutive detections of observed data that does not match the distance data.

Then, the arithmetic processor 1 uses the acquired observed data to update the average and the variance of the distance data (step S13). Specifically, as expressed by the following formula, the $n+1^{th}$ average is updated based on the $n^{th}$ average and the $n+1^{th}$ observed data, while the $n+1^{th}$ variance is updated based on the $n^{th}$ variance and average, and the $n+1^t$ observed data.

Variance $$\sigma^2(n+1) = \frac{n}{n+1}\sigma^2(n) + \frac{n}{(n+1)^2}(a_{obs}(n+1) - a_{mean}(n))^2$$

Average $$a_{mean}(n+1) = \frac{n}{n+1}a_{mean}(n) + \frac{n}{n+1}a_{obs}(n+1)$$

$n$: Number of times of observation $a_{mean}(n)$: Current average $\sigma(n)$: Current variance $a_{obs}(n+1)$: $n+1^{th}$ observed data $a_{mean}(n+1)$: $n+1^{th}$ average $\sigma(n+1)$: $n+1^{th}$ variance Then, the arithmetic processor 1 counts observations of background candidates having distance data equal to the observed data (step S14), and then ranks the background candidates in descending order of the observation counts (step S15). Then, the arithmetic processor 1 detects background data on the basis of the duration of time during which the ranks of the background candidates remain unchanged (step S16).

Figure 9:
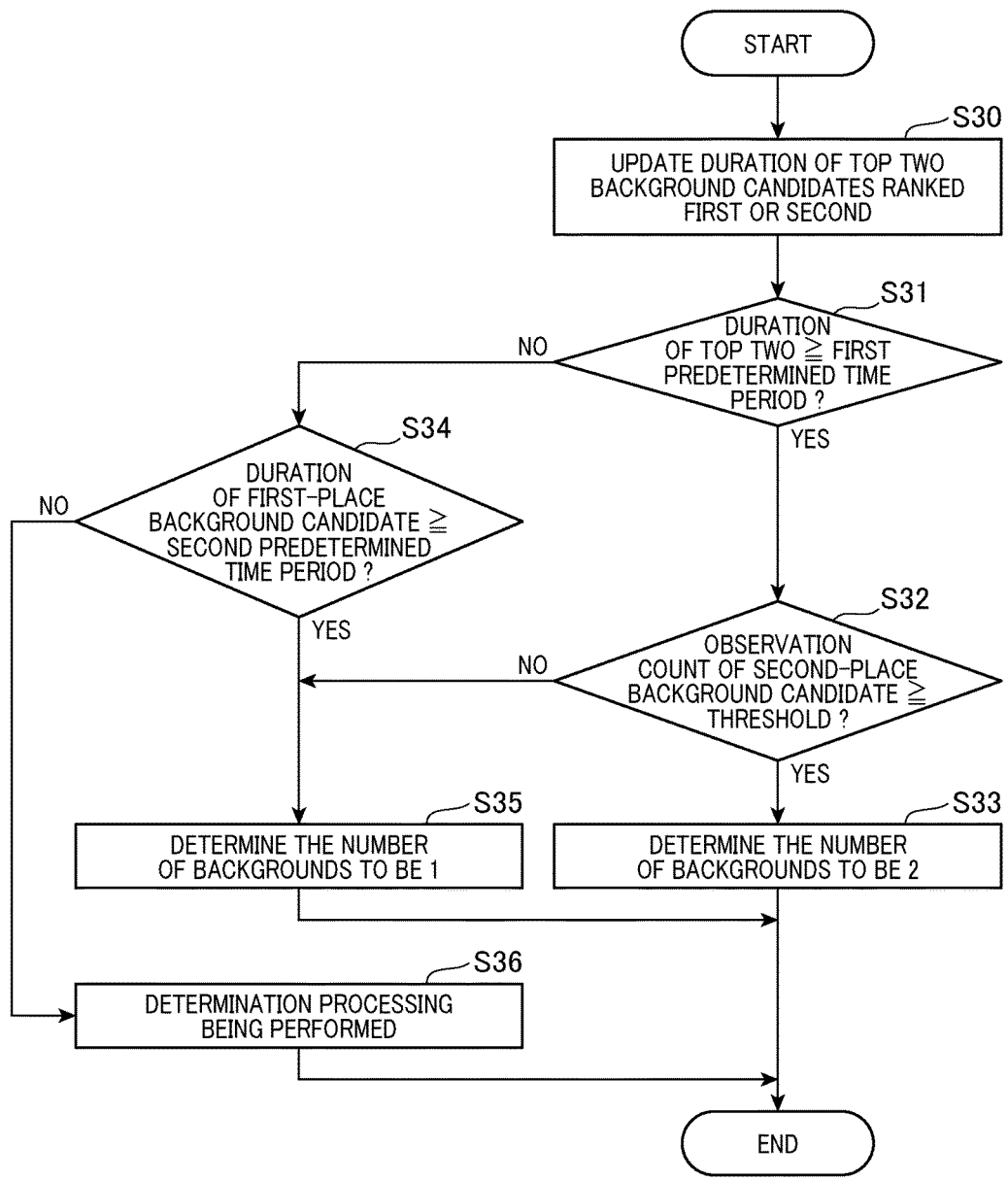
FIG. 9 is a flow diagram of an operation for detecting background from background candidate data, according to the first embodiment.

FIG. 9 is a flow diagram illustrating details of background data count determination processing (step S16). Firstly, the arithmetic processor 1 updates the duration of time during which the ranks of background candidates, which are based on the observation counts, remain unchanged (step S30). If the background candidate that has previously been ranked first keeps first place, the first-place duration of time is incremented. If the background candidate that has previously been ranked first is no longer in the first place, the first-place duration of time is reset to 0. The same applies to the second-place background candidate. The duration of time of the top two background candidates is handled as follows. Specifically, if the background candidate that has previously been ranked first or second keeps the first or second place in the current cycle, the duration of time of the top two background candidates is incremented. If the background candidate that has previously been ranked third is ranked first or second in the current cycle, the time duration of the top two background candidates is reset to 0.

The arithmetic processor 1 determines whether the duration of time of the top two background candidates is not less than the first predetermined period (step S31). If the duration of time of the top two background candidates is not less than the first predetermined period (YES at step S31), the arithmetic processor 1 determines whether the observation count of the second background candidate is not less than a predetermined threshold (step S32). If the observation count of the second background candidate is not less than the threshold (YES at step S32), the arithmetic processor 1 determines that there are two concurrently observed backgrounds (step S33). In other words, the background candidates in the first and second places are determined to be backgrounds. If the observation count of the second-place background candidate has not reached the threshold (NO at step S32), the arithmetic processor 1 determines that the number of backgrounds is one (step S35).

If the duration of time of the top two background candidates is shorter than the first predetermined period (NO at step S31), it is determined whether the duration of time of the first-place background candidate is not less than the second predetermined period (step S34). If the determination results in that the duration of time of the first-place background candidate is not less than the second predetermined period (YES at step S34), the number of backgrounds is determined to be one (step S35). In other words, the first-place background candidate is determined to be a background.

If the duration of time of the first-place background candidate is shorter than the second predetermined period (NO at step S34), the arithmetic processor 1 determines that the background candidate is in the process of being determined as to whether it is a background or a non-background (step S36).

Referring to FIG. 8 again, the operation of the arithmetic processor 1 will be further described. The arithmetic processor 1 determines whether background data has been detected (step S17). If background data has been detected (YES at step S17), the detected background data is stored in the background data memory 21 (step S18). The processing of storing background data into the background data memory 21 is as already described referring to FIGS. 6A to 6C and FIGS. 7A to 7D.

The following description addresses the processing of determining whether there is a background candidate having distance data equal to observed data, focusing on the case in which a negative determination has been made at step S11 (NO at step S11). In this case, the arithmetic processor 1 replaces the background candidate data in the lowest rank with the observed data and sets the observation count to 1 (step S19).

Then, the new registration counter is incremented (step S20). The new registration counter is used for recording the number of consecutive acquisitions of observed data that does not match distance data. If observed data that does not match distance data is consecutively acquired, it is considered that there is a non-background object in the observation direction. Accordingly, the arithmetic processor 1 determines whether the count of the new registration counter has reached a predetermined threshold (step S21). If the count is determined to have reached the predetermined threshold (YES at step S21), the data stored in the background candidate data memory 20 is cleared (step S22). Then, the arithmetic processor 1 allows control to return to the step of acquiring new observation data (step S10). In this way, the processing described above is cyclically performed.

Figure 10:
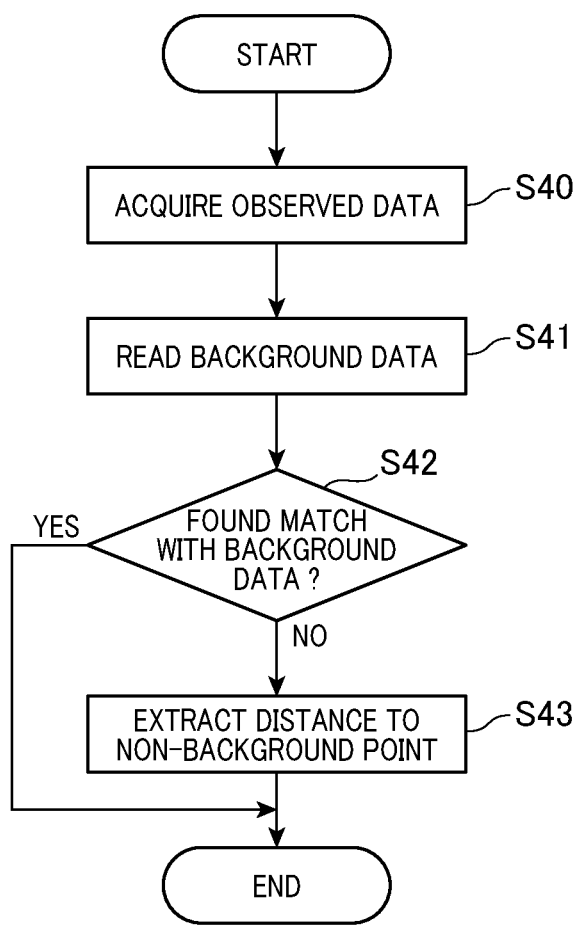
FIG. 10 illustrates a flow diagram of an operation for detecting a non-background object performed by the arithmetic processor.

The following description addresses the processing of detecting a non-background using the background data stored in the background data memory 21. FIG. 10 is a flow diagram illustrating the processing of detecting a non-background. If production of background data is performed separately from detection of a non-background, production and detection may be performed with different cycles. For example, the processing of producing background data (see FIGS. 8 and 9) may be performed at a 1-second cycle, and the processing of detecting a non-background (see FIG. 10) may be performed at a 0.2-second cycle. The processing of producing background data may be performed concurrently with the processing of detecting a non-background. In this case, the arithmetic processor 1 can produce background data, while detecting a non-background.

After acquiring observed data (step S40), the arithmetic processor 1 reads background data of the pixel corresponding to the observed data from the background data memory 21 (step S41) to determine whether the observed data matches the background data (step S42). In the determination of a match as well, the arithmetic processor 1 determines whether the observed data is within the predetermined range in which the background data falls, that is, whether the difference between the observed data and the background data is not more than a criterion.

If the determination results in that the observed data does not match the background data (NO at step S42), the arithmetic processor 1 takes the observed data to be data derived from a non-background point and extracts the distance to the non-background point (step S43). Although FIG. 10 shows processing for one direction (i.e., for one pixel), the flow shown in FIG. 10 is performed for all the pixels. The arithmetic processor 1 can detect a moving object by extracting non-background points from all the pixels.

The configuration and operation of the arithmetic processor 1 of the first embodiment have so far been described. As described above, the arithmetic processor 1 ranks background candidates on the basis of the observation counts to find out two background candidates that have been ranked first or second for a predetermined period. Therefore, if the observed data obtained from the ranging device 30 vary depending on the conditions of the object, a background can be properly determined based on the observed data. For example, in a situation where there is a wire mesh in front of a building, as shown in FIG. 2, and the wire mesh and the building are observed at random, the wire mesh and the building are both detected as a background for storage in the background data memory 21. Accordingly, the wire mesh is no longer erroneously detected as a moving object.

In the present embodiment, arrays that contain representative distance data and the observation count as elements are prepared for use in the background candidate data memory 20 to perform processing, based on the ranks of the observation counts. Use of such arrays can greatly reduce the amount of usage of memory, compared to the method of determining a background, based on the frequency distribution of all the observed data.

The present embodiment has a configuration in which the new registration counter is incremented when new observed data, which is not stored in the background candidate data memory 20, has been obtained, and when the count of the new registration counter has reached a threshold, the background candidate data stored in the background candidate data memory 20 are cleared. If observed data that matches none of the background candidates stored in the background candidate data memory 20 is consecutively obtained, it is considered that the ranging device has captured data of a non-background object. Taking the example shown in FIG. 2, in the case where automobiles continuously pass by the front of the wire mesh, the distance to an automobile that passes by changes. Thus, new observed data is obtained one after another and the new registration counter is successively incremented accordingly. According to the present embodiment, in such a case, the background candidate data are reset, and then when stable observed data comes to be obtained, the background is properly detected.

Second Embodiment

Figure 11:
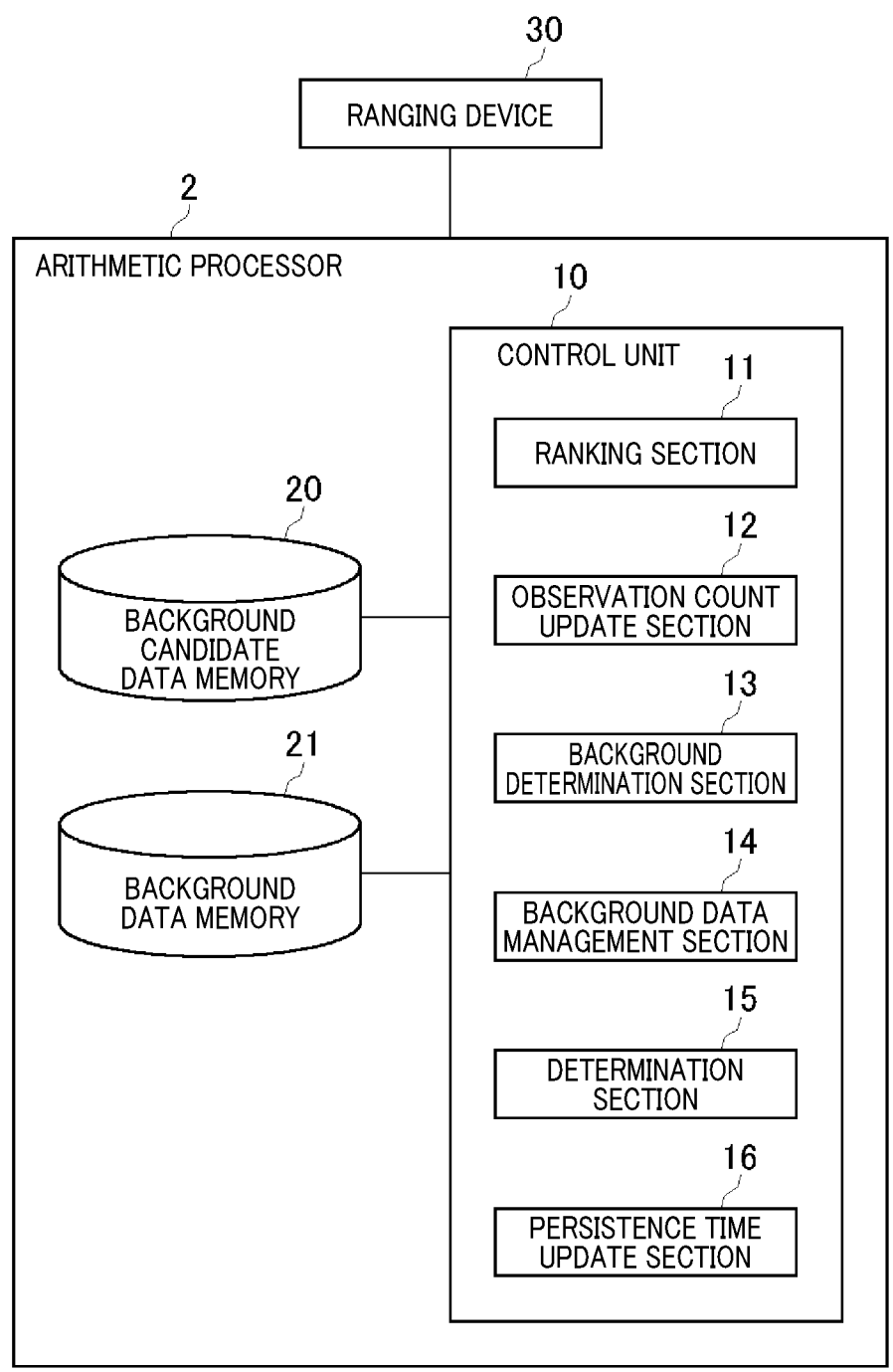
FIG. 11 illustrates a configuration of an arithmetic processor according to a second embodiment of the present invention.
Figure 12:
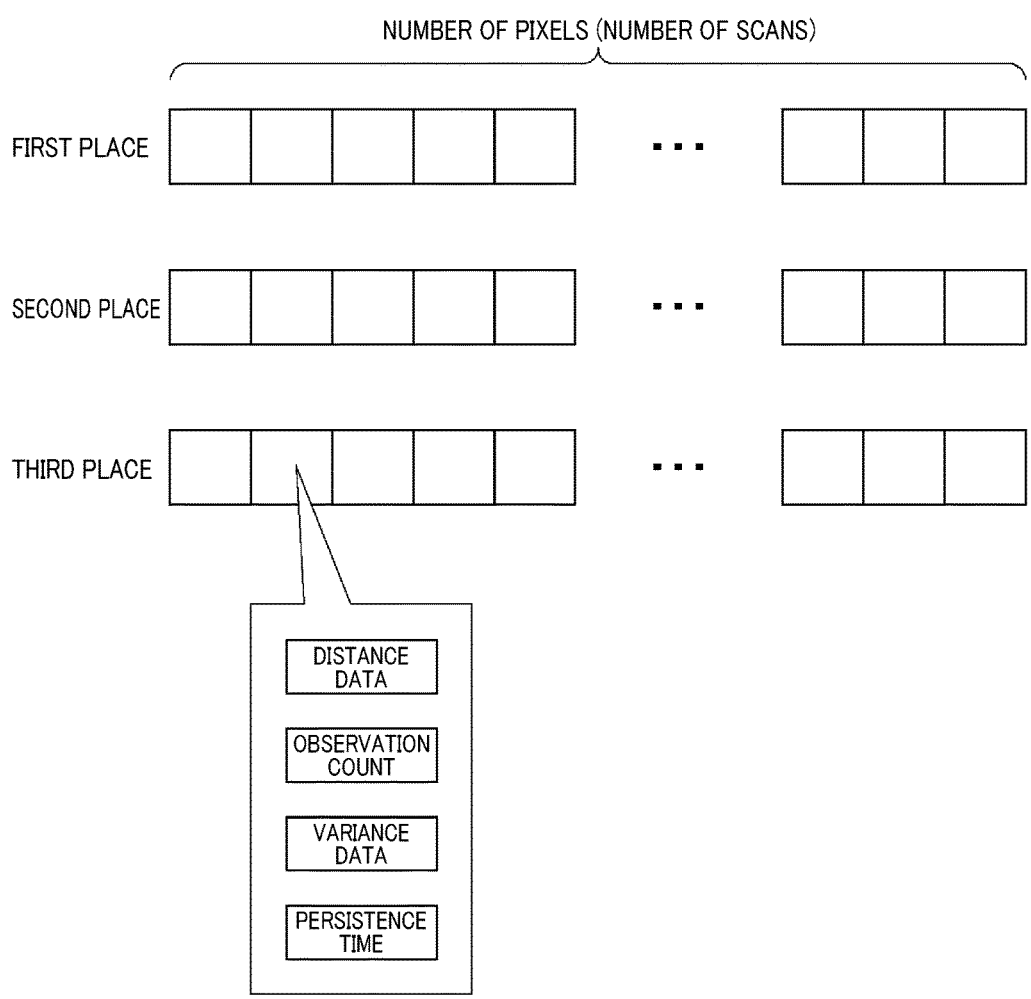
FIG. 12 illustrates an example of data stored in a background candidate data memory, according to the second embodiment.

FIG. 11 illustrates a configuration of an arithmetic processor 2 according to a second embodiment. The arithmetic processor 2 of the second embodiment has a basic configuration similar to that of the arithmetic processor 1 of the first embodiment. However, as shown in FIG. 12, the arithmetic processor 2 of the second embodiment has a background candidate data memory 20 that further stores persistence time of the background candidate data. The persistence time refers to the period of time from the start of storage of the background candidate data, and the counting of the period of persistence time is reset when the background candidate data is cleared. When there is an entry of new observed data as lowest-ranked background candidate data, the persistence time is counted from 1.

In addition to the configuration of the arithmetic processor 1 of the first embodiment, the arithmetic processor 2 of the second embodiment includes persistence time update section 16 that updates persistence time.

In the arithmetic processor 2 of the second embodiment, the ranking section 11 ranks background candidates, based on not only the observation counts but also the persistence time. Specifically, the ranking section 11 ranks the background candidate having a larger observation count at a higher rank. If there are background candidates having the same observation count, the one with shorter persistence time is ranked at a higher rank.

FIG. 13 is a flow diagram illustrating the operation of the arithmetic processor 2 of the second embodiment when producing background data, based on observed data. The basic operation of the arithmetic processor 2 of the second embodiment is similar to that of the arithmetic processor 1 of the first embodiment.

After counting observations on the basis of the observation data, or after storing new observed data as a lowest-ranked background candidate, the arithmetic processor 2 of the second embodiment counts persistence time (step S23).

The time point of clearing the persistence time corresponds to the time point of clearing background candidate data. Specifically, the persistence times of all the background candidates are cleared at the time point of clearing the background candidate data when the count of the new registration counter has reached the threshold (step S22). When new observed data that is new to the background candidate data memory 20 is acquired and replaced with the lowest-ranked background candidate (step S19), the count of the lowest-ranked persistence time is cleared. Thus, the persistence time from when storage of the new observed data is started can be stored in the background candidate data memory 20.

When background candidates are ranked by the ranking section 11 in the arithmetic processor 2 of the second embodiment, if the observation count is the same between background candidates, the one having shorter persistence time is ranked at a higher tank (step S15). In the arithmetic processor 2 of the second embodiment, background candidates are ranked in descending order of the observation counts. If the observation count is the same between background candidates, the one having shorter persistence time is ranked at a higher rank. Thus, if the observation count is the same between background candidates, the one that has been more frequently observed is ranked at a higher rank, whereby a background can be properly determined.

The configuration and operation of the arithmetic processor of the present invention have been described in detail in the embodiments set forth above. However, the present invention should not be construed as being limited to the embodiments described above. The arithmetic processing method of the present invention described in the embodiments set forth above may be implemented in the form of a computer program, or may be implemented by storing such a computer program in a computer readable medium. If the program stored in the recording medium is installed in a computer having a configuration similar to the hardware component of the arithmetic processor 1, the program serves as the arithmetic processor of the present invention. The recording medium may be a non-transitory computer readable medium, such as a CD-ROM.

The embodiments set forth above have been described by way of an example of detecting, as backgrounds, the top two background candidates ranked first or second for a predetermined period, from among three background candidates stored in the background candidate data memory 20. However, three or more background candidates may be detected as backgrounds, from among four or more background candidates. For example, five background candidates may be stored to detect background candidates that have been ranked in the top three places for a predetermined period. Of the five background candidates, three that have been continuously ranked in the top four places for a predetermined period may be detected. Increase in the number of background candidates can stabilize the accuracy in the processing of detecting background. However, as a result of the simulation performed by the inventors, sufficiently high evaluation was obtained even when the number of backgrounds to be obtained was two as in the embodiments described above.

INDUSTRIAL APPLICABILITY

The arithmetic processor of the present invention can obtain a proper number of backgrounds using a ranging device, and can be used, for example, as a device for detecting an object, based on observed data that is obtained by the ranging device.

What is claimed is:

1. A ranging system comprising:
a ranging device configured to scan a field which is present in front of the ranging device and obtain observed data of objects in the field;
a background candidate data memory configured to store data as a background candidate, the data having an observation count of a number of times of obtaining the same observation data that is correlated with distance data representing the observed data;
a background data memory configured to store background data; and
a processor programmed to:
rank a plurality of background candidates stored in the background candidate data memory based on the observation count as a basis to rank the plurality of background candidates stored in the background candidate data memory;
compare observed data obtained by the ranging device with distance data of a background candidate stored in the background candidate data memory to find a match between the observed data and the background candidate of the distance data;
count observations of the background candidate if there is a match;
replace distance data of a lowest-ranked background candidate with the observed data in the absence of a background candidate matching the observed data;
set the observation count to 1;
determine there are M backgrounds if a duration during which the M background candidates are continuously ranked in a top N (M≤N) is equal to or longer than a predetermined period;
select the M background candidates as backgrounds, which are stored as the background data in the background data memory; and
calculate distances to the determined backgrounds.

2. The ranging system according to claim 1,
wherein the objects include a wire mesh which is present in front of a stationary object such that the ranging device scans the wire mesh and the stationary object, and
the background processed from the observed data is the wire mesh.

3. The ranging system according to claim 2, wherein:
the background candidate data memory stores persistence time from when each background candidate has been initially observed; and
the processor is programmed to, if the observation count is the same between background candidates, rank the background candidate having shorter persistence time at a higher rank.

4. The ranging system according to claim 2, wherein:
the background candidate data memory further stores data related to variance of observed data that has been determined to match each background candidate; and
the processor is programmed to determine a range of the distance data based on the data related to variance, and determines the observed data to match the distance data if the observed data falls in the range of the distance data.

5. The ranging system according to claim 4, wherein the data related to variance of the observed data is updated when observations of the background candidate are counted, based on a value of the observed data newly obtained, and data related to variance before counting observations, and the observation count.

6. The ranging system according to claim 2, wherein the processor is programmed to exclude a background candidate of which the observation count does not reach a predetermined threshold, from among the M background candidates that have continued to be ranked in the top N, to obtain a number of backgrounds and the backgrounds.

7. The ranging system according to claim 2, wherein, in the absence of M background candidates that have continued to be ranked in the top N (M≤N) for a predetermined period, if there is a background candidate that is present for a second predetermined period shorter than the predetermined period, the processor is programmed to determine the background candidate as a background.

8. The ranging system according to claim 2, wherein the processor is programmed to reset background candidate data if observed data matching none of background candidates is consecutively obtained for a predetermined number of times.

9. The ranging system according to claim 2, wherein:
the ranging device two-dimensionally scans a three-dimensional space to acquire observed data for each observation direction; and
the processor is programmed to obtain a number of backgrounds and the backgrounds for each observation direction.

10. The ranging system according to claim 2, wherein newly obtained background data is added to the background data memory, and old background data having a position in front of the newly obtained background data is deleted from the background data memory.

11. The ranging system according to claim 2, wherein the processor is programmed to compare observed data acquired by the ranging device with background data stored in the background data memory, and determine that the observed data relates to a non-background, in the absence of background data matching the observed data.

12. The ranging system according to claim 11, wherein:
the background candidate data memory stores persistence time from when each background candidate has been initially observed; and
if the observation count is the same between background candidates, the processor is programmed to rank the background candidate having shorter persistence time at a higher rank.

13. The ranging system according to claim 11, wherein:
the background candidate data memory further stores data related to variance of observed data that has been determined to match each background candidate; and
the processor is programmed to determine a range of the distance data based on the data related to variance, and determines the observed data to match the distance data if the observed data falls in the range of the distance data.

14. The ranging system according to claim 13, wherein the data related to variance of the observed data is updated when observations of the background candidate are counted, based on a value of the observed data newly obtained, and data related to variance before counting observations, and the observation count.

15. The ranging system according to claim 11, wherein the processor is programmed to exclude a background candidate of which the observation count does not reach a predetermined threshold, from among the M background candidates that have continued to be ranked in the top N, to obtain a number of backgrounds and the backgrounds.

16. The ranging system according to claim 11, wherein the processor is programmed to, in the absence of M background candidates that have continued to be ranked in the top N (M≤N) for a predetermined period, if there is a background candidate that is present for a second predetermined period shorter than the predetermined period, determine the background candidate as a background.

17. The ranging system according to claim 11, wherein the processor is programmed to reset background candidate data if observed data matching none of background candidates is consecutively obtained for a predetermined number of times.

18. The ranging system according to claim 11, wherein:
the ranging device two-dimensionally scans a three-dimensional space to acquire observed data for each observation direction; and
the processor is programmed to obtain a number of backgrounds and the backgrounds for each observation direction.

19. The ranging system according to claim 11, wherein newly obtained background data is added to the background data memory, and old background data having a position in front of the newly obtained background data is deleted from the background data memory.

20. The ranging system according to claim 2, wherein:
the background candidate data memory further stores data related to variance of observed data that has been determined to match each background candidate; and
the processor is programmed to determine a range of the distance data based on the data related to variance, and determines the observed data to match the distance data if the observed data falls in the range of the distance data.

21. The ranging system according to claim 2, wherein the processor is programmed to exclude a background candidate of which the observation count does not reach a predetermined threshold, from among the M background candidates that have continued to be ranked in the top N, to obtain a number of backgrounds and the backgrounds.

22. The ranging system according to claim 2, wherein the processor is programmed to, in the absence of M background candidates that have continued to be ranked in the top N (M≤N) for a predetermined period, if there is a background candidate that is present for a second predetermined period shorter than the predetermined period, determine the background candidate as a background.

23. The ranging system according to claim 2, wherein the processor is programmed to reset background candidate data if observed data matching none of background candidates is consecutively obtained for a predetermined number of times.

24. The ranging system according to claim 2, wherein:
the ranging device two-dimensionally scans a three-dimensional space to acquire observed data for each observation direction; and
the processor is programmed to obtain a number of backgrounds and the backgrounds for each observation direction.

25. The ranging system according to claim 2, wherein newly obtained background data is added to the background data memory, and old background data having a position in front of the newly obtained background data is deleted from the background data memory.

26. A processing method, comprising:
obtaining observed data using a ranging device, the ranging device scanning a field which is present in front of the ranging device to obtain observed data of objects in the field;
preparing, using a processor, a background candidate data memory that stores data as a background candidate, the data having an observation count of a number of times of obtaining the same observation data that is correlated with distance data representing the observed data;
ranking, using the processor, a plurality of background candidates stored in the background candidate data memory based on the observation count as a basis to rank the plurality of background candidates stored in the background candidate data memory;
comparing, using the processor, the observed data with distance data of a background candidate stored in the background candidate data memory to find a match between the observed data and the background candidate of the distance data, counting observations of the background candidate if there is a match, and replacing distance data of a lowest-ranked background candidate with the observed data in the absence of a background candidate matching the observed data, and setting the observation count to 1;
processing, using the processor, the observation count as a basis to rank a plurality of background candidates stored in the background candidate data memory, the step being performed by the arithmetic processor;
determining, using the processor, that there are M backgrounds if a duration during which the M background candidates are continuously ranked in a top N (M≤N) for a predetermined period, and selecting the M background candidates as backgrounds, the step being performed by the arithmetic processor;
storing, using the processor, the background data in the background data memory; and
calculating, using the processor, distances to the determined backgrounds.

\* \* \* \* \*